United States Patent Office 3,460,231
Patented Aug. 12, 1969

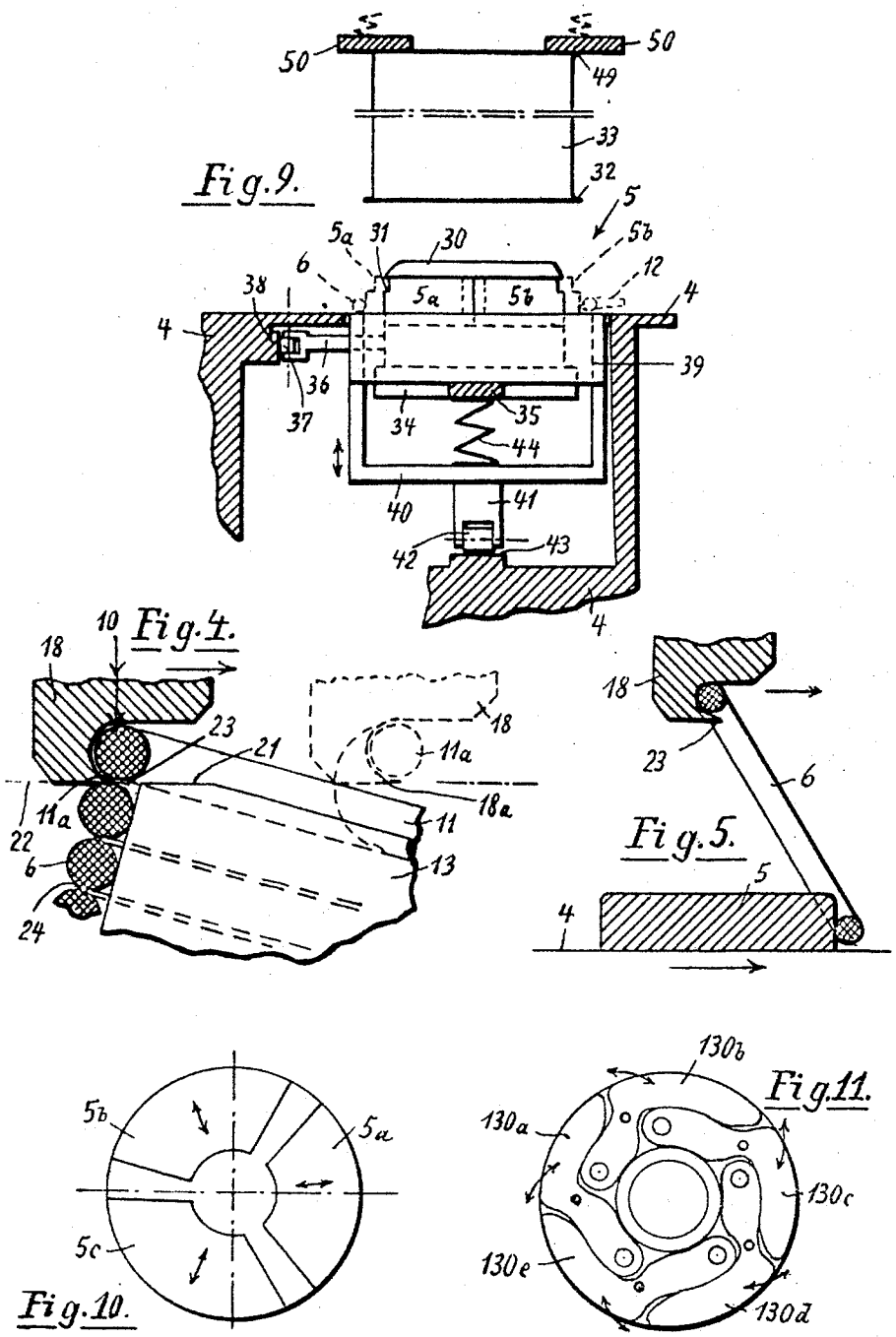

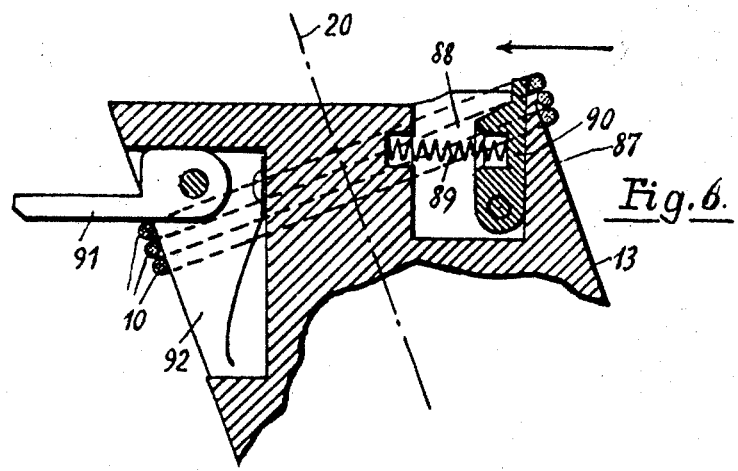
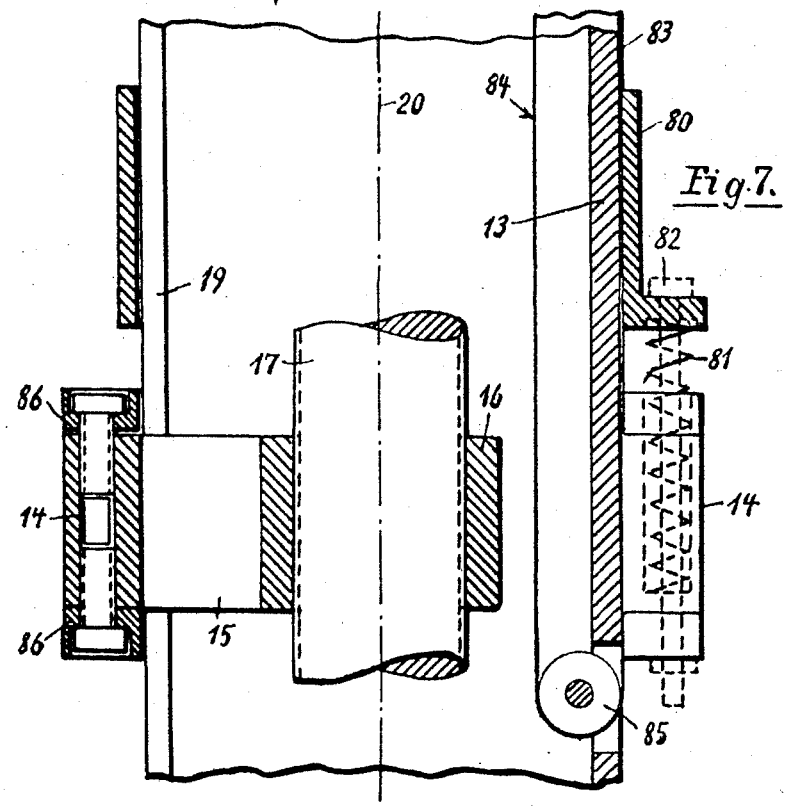

3,460,231
APPARATUS FOR FEEDING AND MOUNTING ELASTIC RINGS ON CONTAINER BODIES
Werner E. Illgen and Karlheinz Stoffregen, Braunschweig, Germany, assignors to J. A. Schmalbach Aktiengesellschaft, Braunschweig, Germany
Filed Nov. 15, 1966, Ser. No. 594,422
Claims priority, application Germany, Nov. 15, 1965, Sch 38,046
Int. Cl. B23p *19/02*
U.S. Cl. 29—208                           21 Claims

ABSTRACT OF THE DISCLOSURE

A rotatable turret carries a series of expandable studs to which elastic sealing rings are fed individually from a supply stack; the studs thereafter expand to deposit each ring on a container fed to the turntable from another supply and, when the rings have been allowed to contrast on the containers they are discharged from the turntable.

---

This invention relates to an apparatus for automatically conveying strip-seal rings of rubber or rubberlike elastic material and for mounting them upon the bodies of containers, especially those to be sealed.

Containers are known whose covers can be readily detached from the body with the help of an elastic ring having a protruding lug and also serving to hermetically seal the container.

The bodies of the containers can be round or otherwise in cross-section. The rings are generally round in cross-section.

In the production of containers with such strip-seal rings or tear-strings, the application of such rings involves certain difficulties. Attempts have been made to first mount the ring under tension on the periphery of the cover so that the cover with the ring on it can be handled as a single article. The unavoidable variations of ring size, as well as the physical properties of the elastic ring material make it difficult to perform this operation automatically.

It is also old to slip the elastic ring upon the container body, which is now generally done by hand. It is an object of this invention to provide an apparatus by which the mounting of the rings upon the container bodies is greatly facilitated and accelerated and which would permit the mounting to be performed automatically with greater speed in a continuous process, and also in a more uniform manner than was possible heretofore.

In the present invention this problem is solved by providing an expansible ring-supporting stud in cooperation with a ring-depositing finger, a container-body positioning apparatus, and a strip-off sleeve, whereby the ring supporting stud with the strip-seal ring thereon and the strip-off sleeve are relatively movable in the axial direction in such a manner that the ring will be moved by the sleeve from the expanded stud to the container body. With the help of the expansible stud the threading of the rings upon the contracted stud will be facilitated to such an extent that it can be done automatically. On the other hand, the expansibility of the stud permits its enlargement to such an extent that the ring can be readily pushed over the flange on the end of the container body and deposited on the latter. Furthermore, it is possible to perform this operation automatically with the help of the strip-off sleeve. This sleeve is positioned coaxially with the stud and with the container body and is movable toward the latter. For this purpose the stud and the container body can be pressed downwardly relative to the strip-off sleeve. It is preferable however to have the stud and the container body remain stationary while the strip-off sleeve is lifted against spring pressure.

The delivery of the strip-seal rings to the expansible studs and their deposition thereon can be effected by simply transferring them with the help of the depositing finger. The same finger preferably also serves to remove individual rings from a stack. It has also been found especially advantageous if the rings are not supplied individully as has been done heretofore, but are deposited by stacks upon ring-supporting spines. It is then possible to take advantage of the fact that the rings, after having been vulcanized while in stacks on the spines, will remain bound together on the spines by a thin film which will keep them in stacked formation. It is also possible to produce the stacks of rings from extruded plastic or rubber tubing having transverse incisions which have not completely separated the rings from one another. These stacks or bundles of rings can be quickly and easily deposited on the ring-supporting spines and in fact in such a manner that the gripping and holding lugs will be arranged one above the other. It will then always be the ring at the top of the stack that will be torn off and removed therefrom.

It is advantageous for this purpose to have the ring-supplying spine positioned at an angle for this purpose. In this way, only that portion of the ring at the top of the stack which faces toward the finger will be in the path of the finger.

The features that are here described can be advantageously combined inthe form of an automatic machine. It is possible therein to arrange a plurality of depositing fingers in star-shaped formation on a continuously rotating vertical shaft, while several expansible studs are carried by rotary table in such a manner that the paths of the fingers and spines will be tangent to each other at a depositing station. The container bodies can be placed upon or removed from the expansible studs in a known manner by means of star wheels for delivering or removing the bodies. Their removal however can also be effected by ejectors of simpler construction.

The apparatus will now be described more in detail with reference to the drawings which show schematically an example of this invention and wherein:

FIG. 4 is a fragmentary vertical cross-section of the upper end of the spine for holding the seal rings in FIG. 2, but on a still greater scale to show the mechanism for taking a ring off the stack.

FIG. 5 is a fragmentary vertical cross-section showing a ring being deposited on an expandible stud.

FIG. 6 is a vertical cross-section of the upper end of the spine shown in FIG. 4, but from the opposite direction and showing details for preventing removal of more than one seal at a time.

FIG. 7 is a fragmentary vertical cross-section of a lower portion of the spine shown in FIGS. 4 and 6.

FIG. 9 is a fragmentary view in elevation and partly in cross-section of a mechanism for operating an expansible stud, with a container suspended overhead.

FIG. 10 is a diagrammatic plane view of one form of expansible stud, and

FIG. 11 is a diagrammatic plane view of a modified form expansible stud.

Figure 1:
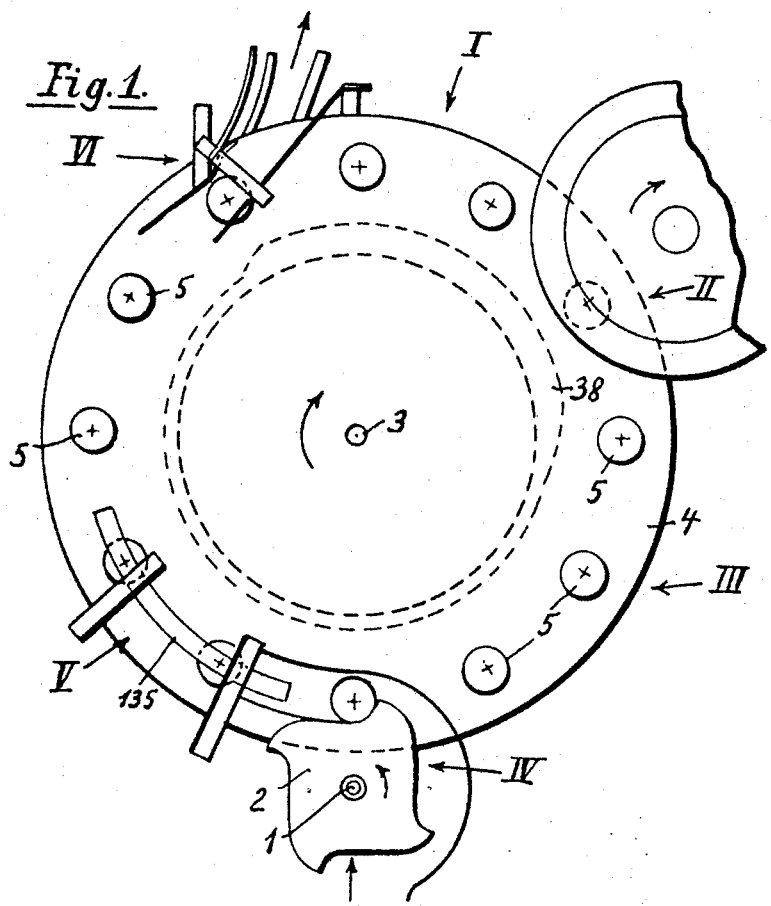
FIGURE 1 is a fragmentary plan view of a portion of a machine with the essential features of this invention.

In FIGURE 1 is shown a portion of an automatic machine with the novel features of this invention in plan view. This machine has a star wheel 2 for depositing container bodies which are delivered to this star wheel in a known manner. The path of the star wheel 2 overlaps the path of a work table 4 which carries a plurality of expansible studs 5. The latter are carried one after another from their starting position I in FIGURE 1 through the following stations:

II. Depositing station for the deposition of the elastic strip seal rings 6;

III. Expanding station in which the studs with the rings thereon are expanded;

IV. Container body delivering station;

V. Ring transfer station where the rings 6 are transferred from the expanded studs 5 to the container body;

VI. Container body removal station, which in the example consists of a simple strip-off means.

Between stations V and VI the studs 5 can be contracted. However, this does not need to be done until immediately before they reach the starting station I.

In the subsequent description reference will be made at the same time to the remaining figures wherein corresponding parts will be referred to by the same reference characters. An important feature of this invention is the use of a stack 10 of connected strip-seal rings 6 (FIGURE 4) as would result from vulcanization on a vulcanizing mandrel or from cutting an extruded rubber or plastic tube. In these cohering stacks 10 the rings 6 are orientated in such a manner that the gripping lugs (not shown) are on top of one another.

Stacks 10 of this kind can be readily positioned on a ring-supporting spine 13 which is formed in such a manner that a stack 10 can be slid upon it with a minimum of friction so that it can be advanced with precision. Such a precise advancement is necessary during automatic operation for the removal of the uppermost ring 11. For effecting such an advancement a supporting ring 14 (FIGURE 7) is provided which is carried by a spider 15 having at its center a movable but non-rotatable nut 16 threaded on a spindle 17 which is rotated in synchronism with the other movable parts of the apparatus in such a manner that the uppermost ring 11 at the time of its removal will always be in the proper position for removal by the depositing finger 18 as shown in FIGURE 4. The spindle 17 is rotatably positioned inside the hollow spine 83 shown in FIGURE 7 which is slotted longitudinally to guide the radial arms of the spider 15. In this way, the ring stack 10 is intermittently raised a distance to the height of one ring in synchronism with the movement of the depositing finger 18.

The ring-supporting spine 13 is positioned in such a manner that its axis 20 will be forwardly inclined from the vertical in such a manner that its cut-away upper end 21 (FIGURE 4) will be exactly horizontal and only slightly below the path 22 of the lower edge 23 of the depositing finger 18.

As shown in the enlarged view of the spine 13 shown in FIGURE 4, the lower edge 23 of depositing finger 18 is in the form of a sharp cutting edge which will sever the binding film 24 that connects the uppermost ring 6 with the ring immediately beneath it. By its continued movement the finger 18 will tear the uppermost ring 11a away from its stack 10 on the spine 13 and with its hook will carry away the severed ring 18a.

To make sure that the ring stack 10 will advance in the direction of the spine axis 20 when the uppermost ring is removed, especially if as a result of inaccurate dimensioning the cutting edge 23 does not strike the connecting film 24 exactly midway between the two uppermost rings, the stack is preferably mounted on a slider 80 (FIGURE 7) which is yieldably seated on springs 81 which are slidably mounted on guide bolts 82.

Since the rings are formed of material with a high coefficient of friction, it may in some cases be difficult to effect a sufficiently uniform advancement of the stack to ensure that the uppermost ring 11 will always be moved into the required position. To avoid such difficulties the peripheral surface of the spine is formed at intervals by the outside runs 83 of several belts or bands 84 distributed over said surface and carried at the top and at the bottom over guide rollers 84 for movement parallelly to the spine axis 20. Said bands may be endless and can be frictionally entrained by the ring stack. Preferably, however, the ends of the bands are clamped by means of clamping rings 86 to the supporting ring 14 so as to force movement of the belts in unison with the supporting ring. A spine of such construction is useful also for other applications.

During the removal of the uppermost ring 11 by the depositing finger 18, the binding film 24 will be torn off around the entire periphery of the stack. The resulting forces will also tend to carry along with them the entire remainder of the stack so that there will be danger of the next ring not getting into its required position for being picked up by the finger 18. To avoid such a difficulty, a spring 89 is positioned in a recess 88 in the upper end of the spine at the edge that is opposite the finger 18 (FIGURE 6), the spring bearing against a resilient retainer 90 which extends upwardly into the path of the finger 18 a distance equal to about the thickness of one ring so as to keep the next following ring in place. There can also be provided at the opposite side of the spine a retaining finger 91 (FIGURE 6) that extends in the direction of movement of the finger 18 (from right to left in FIGURE 6). When a stack of rings is to be mounted on the spine, the retaining finger 91 is temporarily pushed into a recess 92 in the side of the spine 13.

Several fingers 18 can be formed on radial arms in the form of a cross. For example, three fingers can be carried by a disc which is rotatably mounted on a shaft in such a manner that the fingers 18 will successively remove a ring 6 from the spine 13 and deposit it in an expansible stud at station II.

A ring 6 after being picked up by the finger 18 will hang loosely from the hook 23, and while in this position it will reach the depositing station II. The deposition of the ring can be accomplished by merely putting it in place as shown in FIGURE 5. The finger 18 that carries the ring will then approach the expansible stud 5 in depositing station II. Finger 18 and stud 5 both move in the same direction, but the stud 5 has a greater peripheral velocity than the finger 18 (see gear ratio in FIGURE 2). The finger 18 will therefore be overtaken by the stud 5 which will take upon itself the ring 6, thereby removing it from finger 18.

To facilitate the transfer of the ring from the finger 18 to the stud 5, the finger can be slightly lowered so that the ring 6 will find support on the more rapidly moving table 4 and will assume an inclined position (FIGURE 5) to make it easier for the stud to enter the ring.

Figure 3:
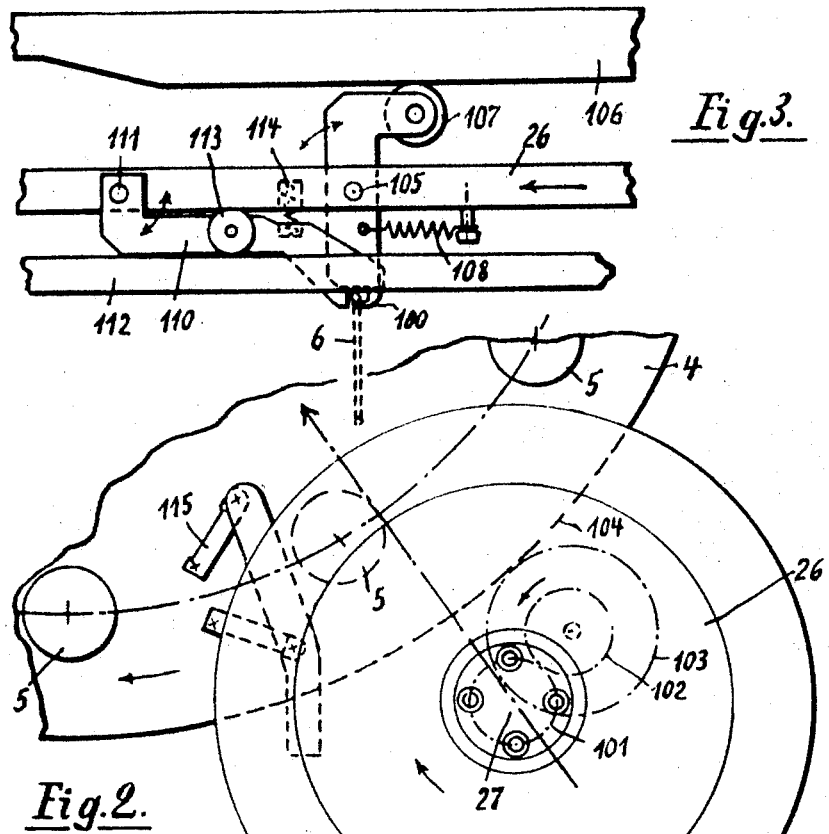
FIG. 3 is a fragmentary side elevation of a portion of the transfer mechanism shown in FIG. 2.
Figure 2:
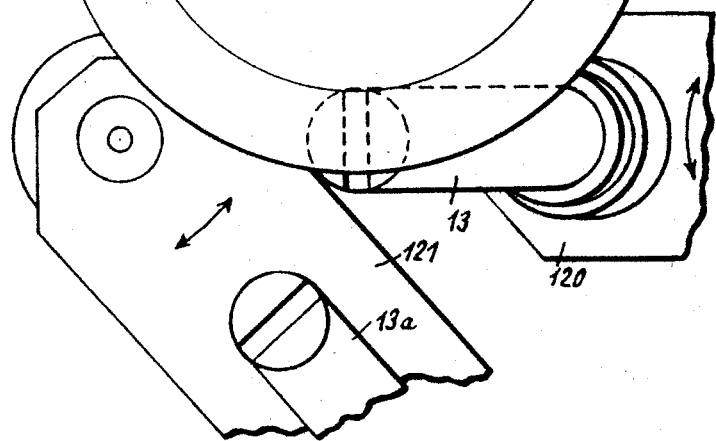
FIG. 2 is a plane view, on an elongated scale, of that portion of the device shown in FIG. 1 which holds a supply of seal rings and feeds them to the expandible studs.

In the preferred constructions in FIGURES 2 and 3 the mounting of the ring on the stud 5 is accomplished in another manner. Here a disc 26 which carries the depositing fingers 100 rotates about an axis 27 while the table 4 which carries the expansible studs 5 moves in the opposite direction in the depositing and expanding station. The synchronous drive can be effected, e.g., through direct gear connections 101, 102, 103 and 104 between disc 26 and table 4. The depositing finger 100 is pivotally mounted at 105 on disc 26. The movement of the finger is controlled by a stationary cam 106 which is contacted by a roller 107 carried by the finger and kept against the cam by a spring 108.

In order to prevent too soon a release of the ring 6 by the hook of the depositing finger 11, it is advantageous to provide a ring retainer 110 which is pivotally mounted at 111 on the same disc 26 and is brought into or out of locking position by a stationary cam 112. For this purpose a roller 113 on the ring retainer 110 is continually urged into contact with the cam 112 by a spring 114.

Figure 8:
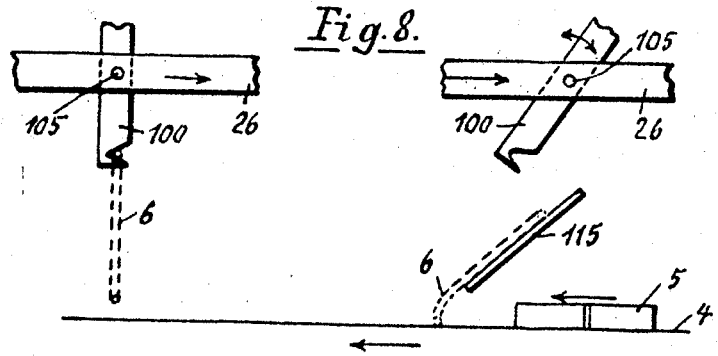
FIG. 8 is a fragmentary side elevation of another portion of the machanism for depositing a seal ring on an expansible stud.

Above the table 4 in the depositing station II, a temporary ring-support 115 is mounted in a fixed position in such a manner that the finger 100 as shown in FIGURES 2 and 8 will by its swinging movement deposit the ring 6 upon the support 115 in such a manner that the lower portion of the ring will hang downwardly to rest upon the surface of the table 4 in the path of the next stud 5 which will come along to take the ring with it.

In the modification shown in FIGURE 2, the disc 26, which carries the depositing fingers 100, has positioned adjacent to its two ring-supporting spines 13 and 13a which are swung alternately into the path of finger 100 and while in swung-out position are replenished with new ring stacks 10 so as to permit continuous operation of the apparatus.

The expansible stud 5 is shown only schematically in FIGURES 1 and 2. It actually consists of several parts, e.g. according to FIGURE 10 of parts 5a, 5b and 5c which when contracted will have a diameter that is small enough relative to the inside diameter of the ring 6 to permit the stud to readily take on the latter.

Instead of being formed of sectors, the stud can also be equipped with swinging arms 130a–130e (FIGURE 11) which are connected to one another and can be swung from the contracted position shown in FIGURE 11 into expanded position.

The stud 5 can carry on its upper side a cover plate 30 (FIGURE 9) under which the expanded parts can be drawn together into contracted position. In their expanded position (shown dotted in FIGURE 9) the parts will extend outwardly so as to present shoulders 31 to receive the lower rim 32 of the container body 33. While the parts are in expanded position, the ring 6 will be held in expanded condition at a lower level than the shoulders 31.

The expansible parts or checks of stud 5 are movable e.g. in guideways 34 and are brought into engagement with the periphery of the table 4 by means of a bar 36 carrying a roller 37 engaging the cam 38.

The stud 5 is surrounded concentrically by a strip-off sleeve 39 with sufficient looseness to permit the stud to be expanded, the upper edge of the sleeve being normally in the plane of the upper surface of the table. The diameter of the sleeve 39 is such that it will surround the expanded stud with only little clearance, and by upward axial movement over the stud will push the ring 6 off the expanded stud 5, over the lower rim 32 of the container and from there upon the lower end of the container body.

For this purpose the sleeve 39 is guided vertically and is mounted on a pusher yoke 40 on a supporting leg 41 carrying a roller 42 travelling along a cam path 43. A spring 44 between the yoke 40 and the member 35 serves to return the sleeve to its lowered position.

During the transfer of the ring 6, the container body 33 must be kept firmly seated with its lower rim 32 on the shoulders 31 of the stud 5. For this purpose there is provided in the apparatus of this example a stationary hold-down device in the form of rails 50 extending over a portion of the table periphery in the region between stations IV–VI along which the upper side with its rim 49 will slide and which gradually come down to within the desired distance of the top of the stud 5, and possibly with a resilient backing. In FIGURE 9 for the sake of clarity the rails 50 and the body 33 are shown at a greater distance from the stud 5. In FIGURE 1 only a single hold-down rail 135 is used.

The guide plate 30, the expanding mechanism and the sleeve 39 are mounted for convenient interchangeability to facilitaate their adaption to container bodies of different sizes. Also for the same purpose the positions of the rails 50 or 135 are preferably adjustable and the ring-supporting spine 13 readily interchangeable.

The strip-off sleeve 39 can also be substituted by a plurality of strip-off fingers.

This new apparatus is also applicable to containers of other shapes by substituting expansible studs of corresponding shapes.

We claim:

1. Apparatus for feeding to and mounting elastic rings on container bodies in which the novel combination comprises an expansible stud for supporting the rings, a finger for depositing rings on the stud, container body positioning apparatus and a strip-off sleeve movable relatively to the stud while a ring is on the stud, the sleeve thereby transferring the ring from the stud to the container body positioning apparatus.

2. Apparatus for feeding to and mounting elastic rings on container bodies in accordance with claim 1, in which the depositing finger carries means for severing a ring from its stack of rings simultaneously with the finger's removal of the severed ring from the stack.

3. Apparatus for feeding to and mounting elastic rings on container bodies in accordance with claim 2, in which there is provided a ring-supporting spine adapted to receive a stack of interconnected rings, said spine being positioned to deliver its uppermost ring to the depositing finger, said finger being movable relative to the stud.

4. Apparatus for feeding to and mounting elastic rings on container bodies in accordance with claim 3, in which the spine has associated with it a device for automatically raising the stack of rings intermittently by a distance equal to the height of one ring, said device being connected to and actuated in synchronism with the depositing finger.

5. Apparatus for feeding to and mounting elastic rings on container bodies in accordance with claim 4, which the device for automatically raising the ring stack comprises a supporting member movable up and down along the spine in combination with an elastically supported slider for receiving the lower end of the ring stack.

6. Apparatus for feeding to and mounting elastic rings on container bodies in accordance with claim 4, in which there are associated with the spine a plurality of peripherally distributed endless belts whose external turns form a jacket for the spine.

7. Apparatus for feeding to and mounting elastic rings on container bodies in accordance with claim 6, in which there are freely rotatable guide rollers supporting the belts.

8. Apparatus for feeding to and mounting elastic rings on container bodies in accordance with claim 4, in which the spine is inclined to the plane of movement of the depositing finger in such manner that it is only the portion of the ring being removed which is directed toward the finger that will be in the path of the latter.

9. Apparatus for feeding to and mounting elastic rings on container bodies in accordance with claim 8 characterized in that in the region of the upper edge of the spine directed toward the depositing finger there is a resilient retainer projecting upwardly into the path of the finger by a distance about equal to the height of a ring.

10. Apparatus for feeding to and mounting elastic rings on container bodies in accordance with claim 8, characterized in that there is a retaining finger which extends in the direction of movement of the finger and on the receding side of the spine.

11. Apparatus for feeding to and mounting elastic rings on container bodies in accordance with claim 1, characterized in that on the lower side of the depositing finger there is a hook portion adapted, after a ring has been picked up by the depositing finger and drawn off the spine, to be kept loosely suspended till deposited.

12. Apparatus for feeding to and mounting elastic rings on container bodies in accordance with claim 11, characterized by the provision of a hook closing element directed toward the hook portion, in combination with a stationary cam controlling the hook closing element by opening and closing same.

13. Apparatus for feeding to and mounting elastic rings on container bodies in accordance with claim 11, characterized in that the front end of the hook portion has a cutting edge adapted to sever the film which interconnects the rings.

14. Apparatus for feeding to and mounting elastic rings on container bodies in accordance with claim 11, characterized in that at a depositing station the mechanism is such the stud and finger move in the same direction parallel to each other but the stud has greater peripheral velocity and when it overtakes the finger it removes from the finger the ring loosely suspended on the finger and takes it up itself before reaching the depositing station.

15. Apparatus for feeding to and mounting elastic rings on container bodies in accordance with claim 11, characterized in that at a depositing station there is a stationary temporary ring support inclined to the plane of movement of the expansible stud, and the depositing finger is adapted to deposit the ring upon this support in the path of movement of the stud; whereby the stud will take up the ring from the support of its own accord.

16. Apparatus for feeding to and mounting elastic rings on container bodies in accordance with claim 1, characterized by the combination that there are a plurality of depositing fingers, a rotatable disc carrying said fingers, a continuously rotating vertical shaft carrying the disc, a plurality of expansible studs, a rotating table on which the studs are mounted, the elements being arranged in such a manner that the fingers and the studs move along tangential paths in the region of a depositing station, a star wheel positioned at a container body delivering station subsequent to the depositing station, said star wheel being rotatable in a direction adapted to deliver container bodies to the table, the rotatable table being provided behind the delivery table with a hold down device adapted to press the container bodies down upon the expansible studs.

17. In apparatus for feeding to and mounting elastic rings on container bodies in accordance with claim 16, characterized by the provision of hold down rails positioned above the table and in converging relation to the table, adapted to bear down upon the upper ends of the container bodies to press them down upon the expansible studs.

18. Apparatus for feeding to and mounting elastic rings on container bodies in accordance with claim 14, characterized in that the rotary table has a peripheral speed that is greater by a predetermined amount than the speed of movement of the depositing finger.

19. Apparatus for feeding to and mounting elastic rings on container bodies in accordance with claim 16, characterized by the provision of an actuating mechanism working in cooperation with the table, said actuating mechanism comprising a stationary cam effective in the angular range between said depositing station and the subsequent container body delivering station to expand the studs.

20. Apparatus for feeding to and mounting elastic rings on container bodies in accordance with claim 16, characterized by the combination of a device associated with the rotary table comprising a stationary cam for lifting the strip-off sleeve while opposite the expansible stud, said device being operable within the same angular range as the hold-down device.

21. Apparatus for feeding to and mounting elastic rings on container bodies in accordance with claim 6, in which each expansible stud has an annular shoulder adapted to receive the lower rim of a container body.

References Cited

UNITED STATES PATENTS

| | | | |
|---|---|---|---|
| 2,670,705 | 3/1954 | Herrold. | |
| 2,683,924 | 7/1954 | Schryver | 29—203 |
| 2,887,767 | 5/1959 | Mott | 29—208 |
| 2,959,847 | 11/1960 | Hohl | 29—235 |
| 3,108,363 | 10/1963 | Haumiller. | |
| 3,302,278 | 2/1967 | Whitney. | |

FOREIGN PATENTS 926,110  4/1955  Germany.

THOMAS H. EAGER, Primary Examiner

U.S. Cl. X.R.

29—235